US012809472B2

(12) United States Patent
Clifton et al.

(10) Patent No.: US 12,809,472 B2
(45) **Date of Patent: *Nov. 24, 2026**

(54) JOYSTICK CONTROL SYSTEM FOR REFUSE VEHICLES

(71) Applicant: Oshkosh Corporation, Oshkosh, WI (US)

(72) Inventors: Cody D. Clifton, Mapleton, MN (US); Vincent Hoover, Byron, MN (US); Joshua Rocholl, Rochester, MN (US); Joseph Nelson, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/318,774

(22) Filed: Sep. 4, 2025

(65) Prior Publication Data

US 2026/0003443 A1 Jan. 1, 2026

Related U.S. Application Data

(63) Continuation of application No. 18/811,301, filed on Aug. 21, 2024, now Pat. No. 12,436,623, which is a continuation of application No. 18/204,507, filed on Jun. 1, 2023, now Pat. No. 12,111,980, which is a continuation of application No. 17/879,947, filed on Aug. 3, 2022, now Pat. No. 11,703,956, which is a continuation of application No. 16/851,229, filed on Apr. 17, 2020, now Pat. No. 11,442,556.

(Continued)

(51) Int. Cl.

*G06F 3/0338* (2013.01)
*B60K 35/10* (2024.01)
*B65F 3/00* (2006.01)

(52) U.S. Cl.

CPC ........... *G06F 3/0338* (2013.01); *B60K 35/10* (2024.01); *B65F 3/00* (2013.01)

(58) Field of Classification Search

CPC . G06F 3/0338; B60K 35/10; B60K 2360/135; B65F 3/00; B60Y 2200/144

See application file for complete search history.

(56) References Cited

U.S. PATENT DOCUMENTS 6,540,043 B2 * 4/2003 Will ....................... B62D 7/159 180/404
6,922,615 B2 * 7/2005 Pillar .................... G01M 17/00 701/1

(Continued)

*Primary Examiner* — Ibrahim A Khan
(74) *Attorney, Agent, or Firm* — Foley & Lardner LLP

(57) ABSTRACT

A joystick control system for a refuse vehicle includes multiple joystick input devices, and a single controller. The single controller is configured to receive a user input from one or more of the multiple joystick input devices. The controller is also configured to identify which of the joystick input devices provide the user input. The controller is also configured to generate control signals, in response to receiving the user input, for one or more controllable elements of the refuse vehicle based on which of the joystick input devices provides the user input and the user input. The controller is also configured to provide the control signals to the one or more controllable elements of the refuse vehicle to operate the one or more controllable elements of the refuse vehicle according to the user input.

14 Claims, 3 Drawing Sheets

Related U.S. Application Data

(60) Provisional application No. 62/840,634, filed on Apr. 30, 2019.

(56) References Cited

U.S. PATENT DOCUMENTS

| | | | | | |
|---|---|---|---|---|---|
| 7,070,381 | B2 * | 7/2006 | Khan | B65F 3/00 | 298/22 C |
| 7,070,382 | B2 * | 7/2006 | Pruteanu | B65F 3/28 | 414/525.2 |
| 7,412,307 | B2 * | 8/2008 | Pillar | B65F 3/00 | 701/1 |
| 10,144,584 | B2 * | 12/2018 | Parker | B65F 3/041 | |
| 10,325,422 | B1 * | 6/2019 | Salinas | G08G 1/20 | |
| 10,351,341 | B2 * | 7/2019 | Whitfield, Jr. | B60R 16/08 | |
| 10,354,474 | B2 * | 7/2019 | Gonen | G07F 17/0014 | |
| 10,633,180 | B2 * | 4/2020 | Salinas | B65F 3/02 | |
| 10,793,351 | B2 * | 10/2020 | Watje | B65F 3/143 | |
| 2002/0159870 | A1 * | 10/2002 | Pruteanu | B65F 3/041 | 414/408 |
| 2002/0195293 | A1 * | 12/2002 | Will | B62D 5/046 | 180/445 |
| 2003/0130765 | A1 * | 7/2003 | Pillar | G05B 19/00 | 701/1 |
| 2003/0163228 | A1 * | 8/2003 | Pillar | A62C 27/00 | 701/1 |
| 2004/0002794 | A1 * | 1/2004 | Pillar | B65F 3/045 | 701/1 |
| 2004/0069865 | A1 * | 4/2004 | Rowe | A62C 27/00 | 239/146 |
| 2004/0208733 | A1 * | 10/2004 | Pruteanu | B65F 3/201 | 414/517 |
| 2004/0227728 | A1 * | 11/2004 | McAlindon | G06F 3/0219 | 345/156 |
| 2005/0110330 | A1 * | 5/2005 | Khan | B60P 1/006 | 298/22 R |
| 2005/0234622 | A1 * | 10/2005 | Pillar | G08G 1/20 | 701/41 |
| 2006/0202544 | A1 * | 9/2006 | Khan | B65F 3/00 | 298/17 R |
| 2006/0204352 | A1 * | 9/2006 | Khan | B65F 3/06 | 414/408 |
| 2008/0004777 | A1 * | 1/2008 | Quigley | B28C 5/422 | 701/50 |
| 2008/0221754 | A1 * | 9/2008 | Rowe | F41A 27/20 | 701/36 |
| 2009/0025378 | A1 * | 1/2009 | Laumer | B65F 3/06 | 60/395 |
| 2009/0223734 | A1 * | 9/2009 | Frett | E02F 9/2004 | 180/333 |
| 2010/0057307 | A1 * | 3/2010 | Copeland | E02F 9/2004 | 701/50 |
| 2014/0182277 | A1 * | 7/2014 | Kuipers | B62D 9/00 | 60/327 |
| 2015/0093221 | A1 * | 4/2015 | Parker | B65F 3/041 | 414/303 |
| 2016/0318465 | A1 * | 11/2016 | Brooks | A01M 7/0089 | |
| 2016/0347228 | A1 * | 12/2016 | Franiak | B60P 1/00 | |
| 2017/0114524 | A1 * | 4/2017 | Wuisan | E02F 9/2004 | |
| 2017/0247186 | A1 * | 8/2017 | Whitfield, Jr. | B65F 3/06 | |
| 2017/0275851 | A1 * | 9/2017 | Huber | B60K 35/10 | |
| 2017/0362030 | A1 * | 12/2017 | Steimel | B65F 3/041 | |
| 2018/0101245 | A1 * | 4/2018 | Sewlochan | G06F 9/44505 | |
| 2018/0154799 | A1 * | 6/2018 | Lota | B60K 35/10 | |
| 2018/0251296 | A1 * | 9/2018 | Whitfield, Jr. | B60R 16/08 | |
| 2018/0319642 | A1 * | 11/2018 | Pronger | G06V 20/58 | |
| 2019/0225422 | A1 * | 7/2019 | Wrigley | B60Q 5/006 | |
| 2019/0325220 | A1 * | 10/2019 | Wildgrube | G06V 20/58 | |
| 2020/0048865 | A1 * | 2/2020 | Dauth | B60K 35/10 | |
| 2020/0247609 | A1 * | 8/2020 | Maroney | B65F 3/02 | |
| 2020/0339345 | A1 * | 10/2020 | Lewis | B65F 3/048 | |
| 2020/0339346 | A1 * | 10/2020 | Maroney | B25J 13/088 | |
| 2021/0341033 | A1 * | 11/2021 | Breutzman | G05G 5/02 | |

* cited by examiner

JOYSTICK CONTROL SYSTEM FOR REFUSE VEHICLES

CROSS-REFERENCE TO RELATED PATENT APPLICATIONS

This application is a continuation of U.S. application Ser. No. 18/811,301, filed Aug. 21, 2024, which is a continuation of U.S. application Ser. No. 18/204,507, filed Jun. 1, 2023, which is a continuation of U.S. application Ser. No. 17/879,947, filed Aug. 3, 2022, granted as U.S. Pat. No. 11,703,956, which is a continuation of U.S. application Ser. No. 16/851,229, filed Apr. 17, 2020, granted as U.S. Pat. No. 11,442,556, which claims the benefit of and priority to U.S. Provisional Patent Application No. 62/840,634, filed Apr. 30, 2019, the entire disclosures all of which are incorporated herein by reference in their entireties.

BACKGROUND

The present disclosure relates control systems for refuse vehicles. More particularly, the present disclosure relates to joystick control systems for refuse vehicles.

SUMMARY

One implementation of the present disclosure is a joystick control system for a refuse vehicle, according to an exemplary embodiment. The joystick control system includes multiple joystick input devices, and a single controller. The single controller is configured to receive a user input from one or more of the multiple joystick input devices. The controller is also configured to identify which of the joystick input devices provide the user input. The controller is also configured to generate control signals, in response to receiving the user input, for one or more controllable elements of the refuse vehicle based on which of the joystick input devices provides the user input and the user input. The controller is also configured to provide the control signals to the one or more controllable elements of the refuse vehicle to operate the one or more controllable elements of the refuse vehicle according to the user input.

Another implementation of the present disclosure is a refuse vehicle, according to an exemplary embodiment. The refuse vehicle includes multiple controllable elements, and a joystick control system. The joystick control system includes multiple joystick input devices and a controller. The controller is configured to receive a user input from one or more of the multiple joystick input devices. The controller is also configured to identify which of the joystick input devices provide the user input. The controller is also configured to generate control signals, in response to receiving the user input, for one or more of the multiple controllable elements based on which of the joystick input devices provide the user input and the user input. The controller is also configured to provide the control signals to the controllable elements of the refuse vehicle to operate the controllable elements according to the user input.

Another implementation of the present disclosure is a method for operating multiple controllable elements of a refuse vehicle, according to an exemplary embodiment. The method includes receiving multiple user inputs from multiple joystick input devices. The method includes, for each of the multiple user inputs, identifying, by a single controller, which of the plurality of joystick input devices provides the user input. The method also includes identifying, by the single controller, a corresponding controllable element based on which of the plurality of joystick input devices provide the user input. The method also includes generating, by the single controller, a control signal for the corresponding controllable element based on (a) which of the plurality of joystick input devices provide the user input, and (b) the user input. The method also includes operating the corresponding controllable element using the control signal.

The invention is capable of other embodiments and of being carried out in various ways. Alternative exemplary embodiments relate to other features and combinations of features as may be recited herein.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring generally to the FIGURES, a control system for a refuse vehicle is shown. The control system includes a single controller (e.g., a single computer) and two or more joystick input devices. The single controller can receive user inputs from the various joystick input devices and, based on an identified one of the various joysticks that generates the user inputs and associated operations, generate control signals for controllable elements of the refuse vehicle (e.g., a lift arm, a pump, a hydraulic motor, etc.). The single controller then provides the control signals to the controllable elements to operate the refuse vehicle to perform the operations requested by an operator.

Figure 1:
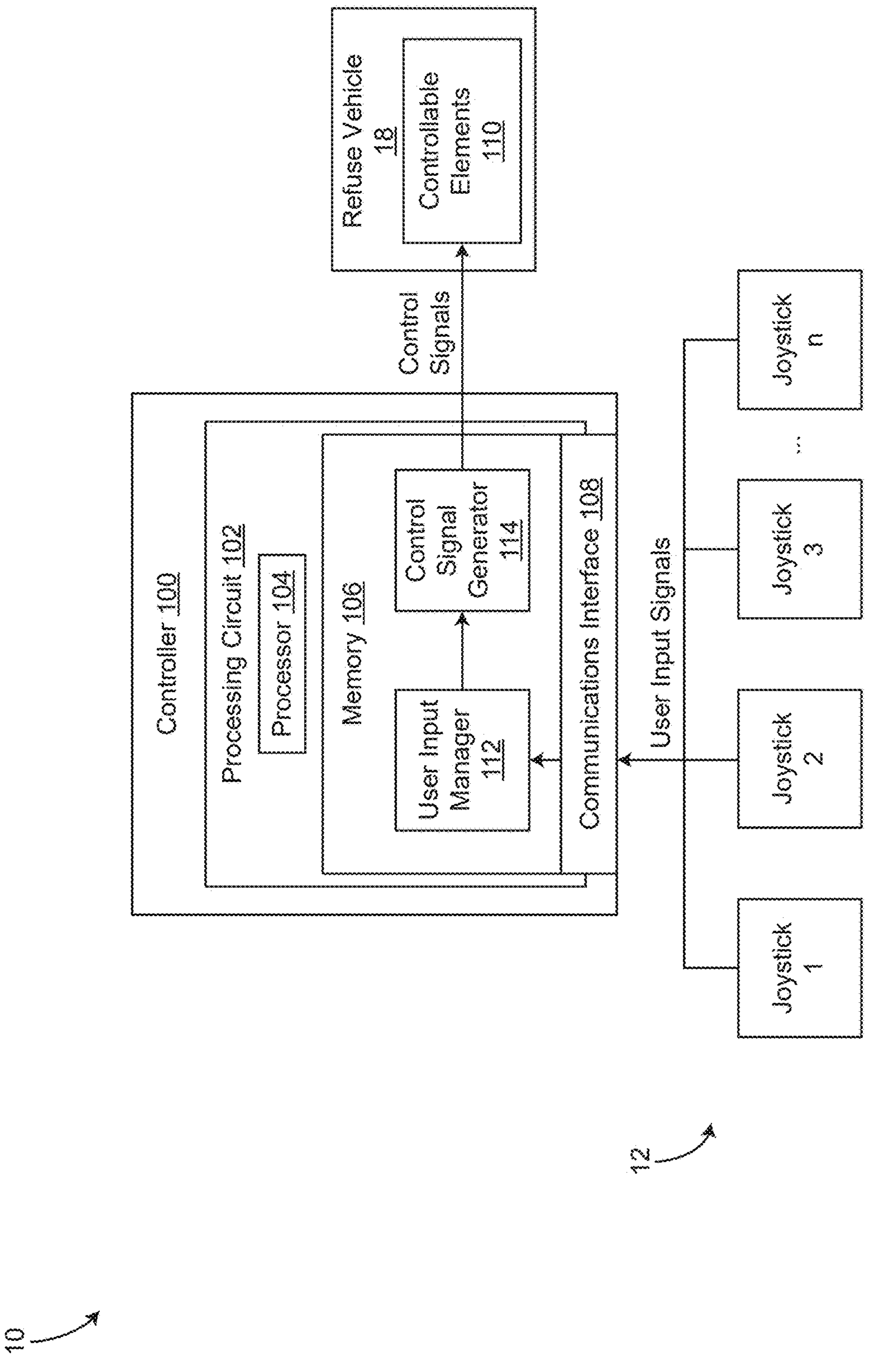
FIG. 1 is a block diagram of a joystick control system for a refuse vehicle, according to some embodiments.

Referring particularly to FIG. 1, a joystick control system 10 for a refuse vehicle 18 is shown, according to some embodiments. Joystick control system 10 can be implemented on a front loading refuse vehicle, a rear loading refuse vehicle, a side loading refuse vehicle, or any other configured refuse vehicle. For example, joystick control system 10 can be implemented on a front loading refuse vehicle that includes an intermediate collection device.

Joystick control system 10 includes joysticks 12, controller 100, and controllable elements 110, according to some embodiments. Joysticks 12 can include any n number of joysticks (e.g., 2 joysticks, 1 joystick, 3 joysticks, etc.). In some embodiments, joysticks 12 includes two or more joystick input devices. Joysticks 12 can be any user input device that includes a stick or column that pivots relative to a base member and generates user input signals based on the pivoting/rotation of the stick relative to the base member. Any of joysticks 12 can include any additional buttons, switches, triggers, levers, dials, etc., configured to receive a user input. Joysticks 12 that include additional buttons, switches, triggers, levers, dials, etc., can provide user input signals to controller 100 based on actuation of the various buttons, switches, etc.

Controller 100 is configured to receive user input signals from joysticks 12 and generate and provide control signals to controllable elements 110. Controllable elements 110 can represent any device, system, element, etc., of refuse vehicle 18 that joystick control system 10 is configured to control. For example, controllable elements 110 can include loading arms, lift arms, articulated arms, a front loading control system, a side loading control system, an intermediate loading system, an intermediate carry can, etc., and any of the primary movers, actuators, etc., of the various devices, systems, subsystems, etc., (e.g., hydraulic pumps, hydraulic motors, electric motors, hydraulic cylinders, linear electric cylinders, etc.). Controllable elements 110 can be any devices, apparatuses, systems, subsystems, etc., for loading, lifting, compacting, etc., refuse bins or containers into a hopper or compartment of the refuse vehicle 18.

Each of joysticks 12 can be configured to operate any systems, subsystems, devices, operations of one or more systems, subsystems, etc., of the refuse vehicle 18. For example, joystick 1 can be configured to operate an intermediate loading system (e.g., an intermediate carry can), while joystick 2 may be configured to operate the main loading system (e.g., front loading arms) of the refuse vehicle 18. In further example, rotation/pivoting of the stick of joystick 1 about a first axis or in a first direction can operate a first operation of the intermediate loading system, while rotation/pivoting of the stick of joystick 1 about a second axis or in a second direction can operate another operation of the intermediate loading system (or of the main loading system).

Controller 100 can include a communications interface 108. Communications interface 108 may facilitate communications between controller 100 and external systems, devices, sensors, etc. (e.g., controllable elements 110, joysticks 12, etc.) for allowing user control, monitoring, and adjustment to any of the communicably connected devices, sensors, systems, primary movers, etc. Communications interface 108 may also facilitate communications between controller 100 and a human machine interface. Communications interface 108 may facilitate communications between controller 100 and joysticks 12.

Communications interface 108 can be or include wired or wireless communications interfaces (e.g., jacks, antennas, transmitters, receivers, transceivers, wire terminals, etc.) for conducting data communications with sensors, devices, systems, joysticks, etc., of joystick control system 10 or other external systems or devices (e.g., a user interface, an engine control unit, etc.). In various embodiments, communications via communications interface 108 can be direct (e.g., local wired or wireless communications) or via a communications network (e.g., a WAN, the Internet, a cellular network, etc.). For example, communications interface 108 can include an Ethernet card and port for sending and receiving data via an Ethernet-based communications link or network. In another example, communications interface 108 can include a Wi-Fi transceiver for communicating via a wireless communications network. In some embodiments, the communications interface is or includes a power line communications interface. In other embodiments, the communications interface is or includes an Ethernet interface, a USB interface, a serial communications interface, a parallel communications interface, etc.

Communications interface 108 can be configured to serially communicate with any of the n number of joysticks 12. In some embodiments, communications interface 108 includes a separate serial communications port for each of the n joysticks 12. For example, communications interface 108 can include n number of USB ports (or Ethernet ports, or any other serial or parallel communications port) configured to communicably couple controller 100 with joysticks 12.

Controller 100 includes a processing circuit 102, a processor 104, and memory 106, according to some embodiments. Processing circuit 102 can be communicably connected to communications interface 108 such that processing circuit 102 and the various components thereof can send and receive data via the communications interface. Processor 104 can be implemented as a general purpose processor, an application specific integrated circuit (ASIC), one or more field programmable gate arrays (FPGAs), a group of processing components, or other suitable electronic processing components.

Memory 106 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 106 can be or include volatile memory or non-volatile memory. Memory 106 can include database components, object code components, script components, or any other type of information structure for supporting the various activities and information structures described in the present application. According to some embodiments, memory 106 is communicably connected to processor 104 via processing circuit 102 and includes computer code for executing (e.g., by processing circuit 102 and/or processor 104) one or more processes described herein.

Referring still to FIG. 1, memory 106 can include a user input manager 112, and a control signal generator 114. User input manager 112 can receive any user input signals (e.g., Controller Area Network (CAN) signals) from joysticks 12 through communications interface 108. User input manager 112 can store information about each of joysticks 12 and their respective operations. For example, user input manager 112 can store information regarding joystick 1, and which devices, systems, subsystems, operations, etc., of controllable elements 110 correspond to joystick 1. Likewise, user input manager 112 can store information regarding any of the n joysticks 12 and the various systems, subsystems, devices, operations, etc., associated with each of the n joysticks 12. In some embodiments, user input manager 112 stores a mapping (e.g., a table, a set of instructions, a database, etc.) that maps the various joysticks 12 with their respective systems, subsystems, devices, operations, etc. User input manager 112 can analyze any of the received CAN user input signals received from joysticks 12 to identify which of joysticks 12 the CAN user input signals are received from (e.g., identifying a CAN address of each of joysticks 12).

User input manager 112 can provide control signal generator 114 with an indication regarding the user input signals and an identification regarding which of the n joysticks 12 produces the user input signal. For example, user input manager 112 can provide control signal generator 114 with the user input signals and the identification regarding which joystick 12 the user input signals were generated by, as well as an indication regarding the associated systems, devices, subsystems, operations, functions, etc., of controllable elements 110 for the particular joystick 12.

Control signal generator 114 can receive the user input signals from user input manager 112, the identified joystick 12 that generated the user input signals, and which devices, collections of devices, systems, subsystems, etc., of controllable elements 110 that correspond to the identified joystick 12. Control signal generator 114 is configured to generate control signals for the various controllable elements 110 that correspond to joysticks 12. Control signal generator 114 can receive the mapped functions, devices, subsystems, systems, etc., of the user input signals from user input manager 112 and generate control signals for the appropriate controllable elements 110 based on the user input signals received from user input manager 112.

For example, joystick 1 can be configured to operate the intermediate lift apparatus/system, while joystick 2 is configured to operate the main lift apparatus/system. An operator can pivot or operate joystick 1 to generate user input signals. The user inputs signals are provided to controller 100 through communications interface 108. Specifically, the user input signals are provided to user input manager 112. User input manager 112 can receive the user input signals from joystick 1 through communications interface 108 and identify which of joysticks 12 generated the user input signals. User input manager 112 can identify that the user input signals are received through a particular communications port and can identify that joystick 1 generated the user input signals based on the particular communications port the user input signals are received through and using the mapping. In some embodiments, user input manager 112 analyzes the received signals to identify which of joysticks 12 generated the user input signals. User input manager 112 can provide the user input signals and/or the requested operations to control signal generator 114. Control signal generator 114 then uses the identified joystick (e.g., joystick 1) and the associated operations, systems, devices, subsystems, etc., to operate controllable elements 110 to perform the operation requested by the operator.

Other control systems for refuse vehicles include a controller that corresponds to each joystick. For example, in such control systems, if three joysticks are implemented to operate various controllable elements of the refuse vehicle, three separate computers are used. Some control systems user a single joystick with a switch to change what signals the joystick sends to the computer. To be properly configured to control refuse vehicles with various systems of controllable elements (e.g., lifting apparatuses, articulated arms, intermediate lift devices, loading devices, loading systems, etc.), these control systems require additional modification (e.g., either additional computers or additional switches).

Advantageously, joystick control system 10 can be used for refuse/garbage collection vehicles with various uses, configurations, and/or applications. Joystick control system 10 is a single, unitary system, with a single controller 100 that can accommodate for the various use cases, configurations, and/or applications. Joystick control system 10 can save time, reduce errors, and therefore save costs associated with operating the refuse vehicle 18 and installing or modifying the refuse vehicle's control system. For example, joystick control system 10 can be used for a front end loader refuse collection vehicle. Front end loader refuse collection vehicles can have multi-use/multi-configurations, can be configured for residential refuse collection, or commercial refuse collection, or both. Front end loader refuse collection vehicles can also be used for recycling collection, garbage collection, organic waste collection, etc. Accordingly, there are many different attachments, systems, subsystems, apparatuses, configurations, etc., of front end loader refuse collection vehicles. In this case, joystick control system 10 can be used with various joysticks 12 to operate the various systems, apparatuses, sub-systems, etc., of the variously configured front end loader refuse vehicles. It should be understood, however, that joystick control system 10 can be used for any refuse collection vehicle and is not limited to only front end loader refuse collection vehicles.

Advantageously, joystick control system 10 provides a versatile control system that can be easily modified, installed, and operated to control a refuse vehicle 18. Other control systems cannot be as easily modified, and require replacement or addition of computers, switches, etc. Joystick control system 10 facilitates addition and removal of joysticks 12 to suit the specific configuration of the refuse vehicle 18. Other refuse collection vehicle control systems do not provide this advantage. Joystick control system 10 advantageously does not require additional computers for additional joysticks and provides a more cost-effective and versatile control system.

Figure 2:
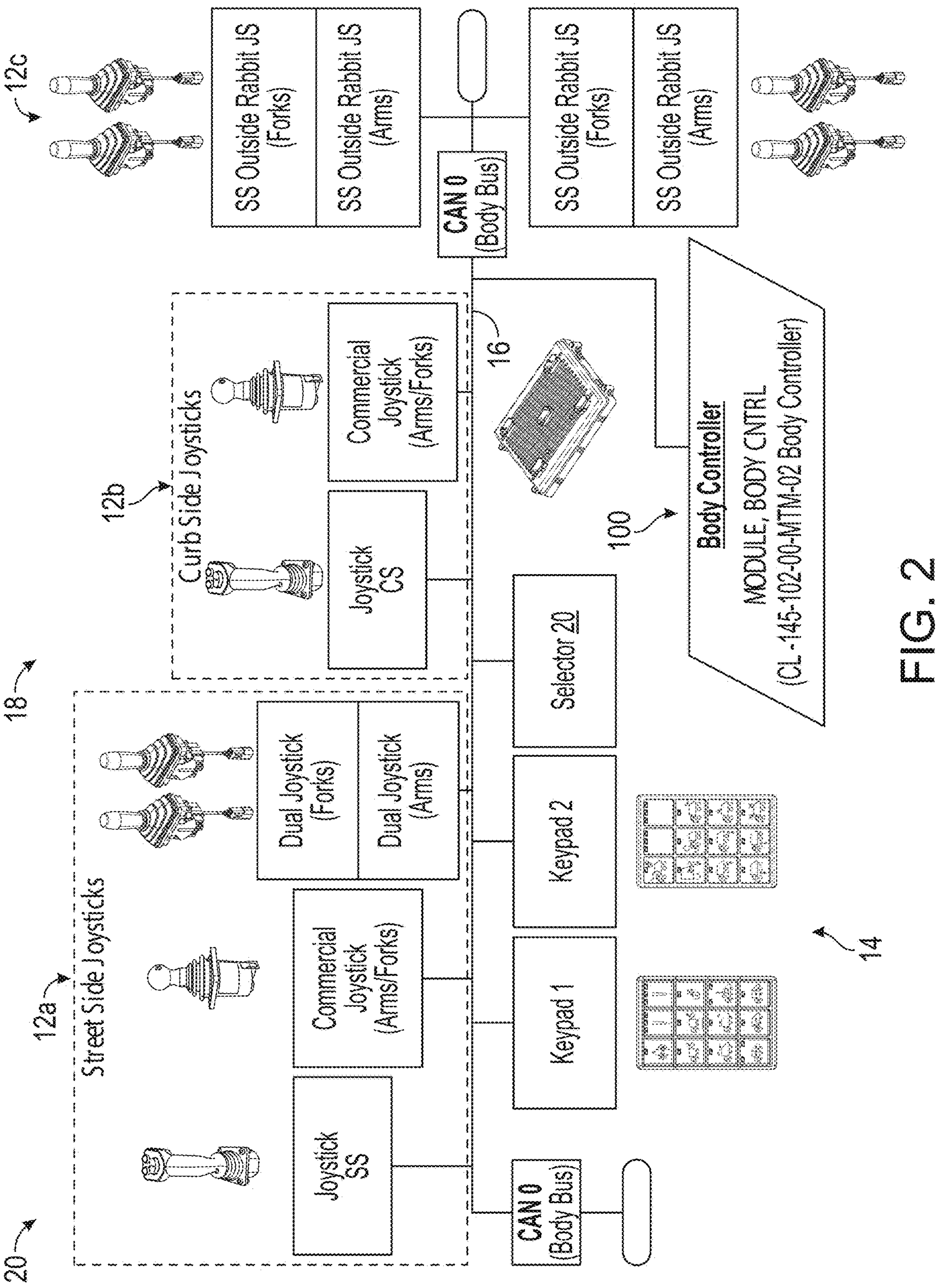
FIG. 2 is a block diagram of a joystick control system for a refuse vehicle, according to some embodiments.

Referring now to FIG. 2, a joystick control system 20 includes a first joystick group 12*a*, a second joystick group 12*b*, and a third joystick group 12*c*. Joystick control system 20 can be the same as or similar to joystick control system 10. For example, joystick control system 20 includes controller 100 that can be configured to perform any of the analysis, control, etc., as controller 100 of joystick control system 10 described in greater detail above with reference to FIG. 1.

Joystick groups 12*a*-12*c* can each include any number of a variety of joysticks (e.g., one joystick, a plurality of joysticks, etc.). For example, joystick groups 12*a*-12*c* can include commercial joysticks configured to operate various controllable elements (e.g., arms/forks) of the refuse vehicle 18. Joystick group 12*a* includes street-side joysticks configured to operate an apparatus of the refuse vehicle 18 (shown as controllable elements 110). Joystick group 12*a* can be a group of joysticks that are positioned on a street-side of the refuse vehicle 18. Joystick group 12*b* includes curbside joysticks (e.g., positioned on a curb-side of the refuse vehicle 18) configured to operate the apparatus of the refuse vehicle 18. Joystick group 12*c* includes both street side and curbside joysticks configured to operate various apparatuses of the refuse vehicle 18.

Referring still to FIG. 2, joystick control system 20 includes a keypad group 14 and a selector 20. Keypad group 14 includes one or more keypads configured to receive a user input to transition the refuse vehicle 18 between various modes of operation. In some embodiments, controller 100 adjusts an operation of controllable elements 110 differently based on a selected mode indicated by the operator through any of the keypads. Each of the keypads can include a plurality of buttons that an operator can press to transition the refuse vehicle 18 between various predetermined/predefined modes of operation.

In some embodiments, selector 20 is transitionable between a first position and a second position to activate or deactivate various of joystick groups 12*a*-12*c*. For example, when selector 20 is transitioned into the first position, joystick group 12*a* may be configured to operate the apparatus of refuse vehicle 18 (shown as controllable elements 110 in FIG. 1). Likewise, when selector 20 is transitioned into the second position, joystick group 12*b* may be configured to operate the apparatus of refuse vehicle 18 (shown as controllable elements 110 in FIG. 1). In this way, operation of selector 20 may activate or deactivate joystick group 12*a*, joystick group 12*b*, and/or joystick group 12*c*.

Controller 100 is configured to communicably connect with any of joystick groups 12*a*-12*c*, keypad group 14, and controllable elements 110 through a Controlled Area Network (CAN) bus 16. In some embodiments, controller 100, joystick groups 12*a*-12*c*, keypad group 14, and controllable elements 110 are wiredly connected with CAN bus 16. In some embodiments, CAN bus 16 also facilitates communications between various devices, sensors, systems, subsystems, etc., of the refuse vehicle 18.

Figure 3:
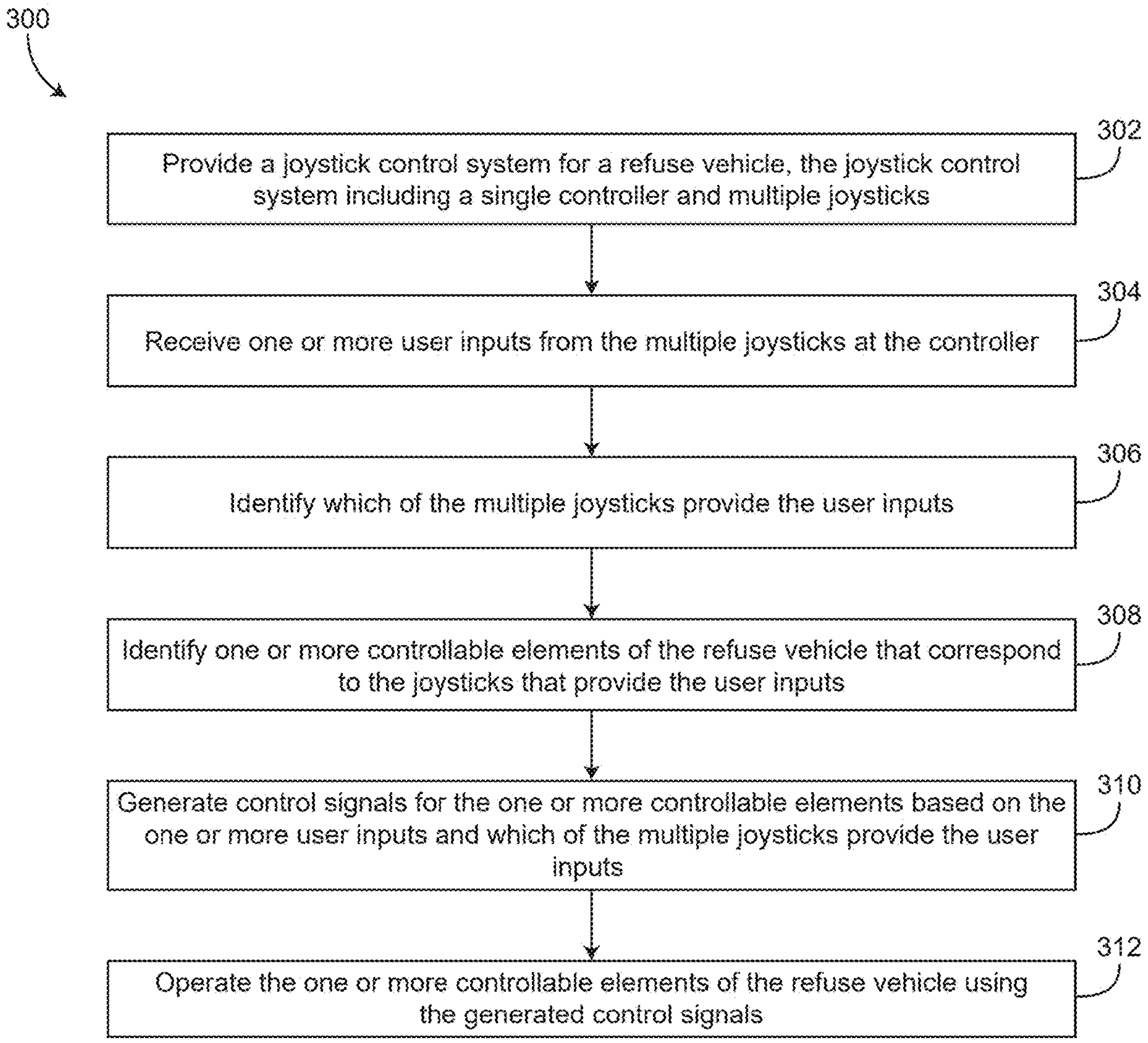
FIG. 3 is a flow diagram of a process for operating multiple controllable elements of a refuse vehicle with multiple joysticks and a single controller, according to some embodiments.

Referring particularly to FIG. 3, a process 300 can be performed (e.g., using controller 100) to provide a user-centric control system for a refuse vehicle. Process 300 can be performed so that a refuse vehicle which has multiple controllable elements (e.g., systems, sub-systems, devices, articulating arms, boom arms, loading mechanisms, etc.), and multiple joysticks or input devices that are configured to operate the various controllable elements use a single controller, thereby simplifying a control scheme or control system for the multiple joysticks and the multiple controllable elements.

Process 300 includes providing a joystick control system for a refuse vehicle, the joystick control system including a single controller and multiple joysticks (step 302), according to some embodiments. In some embodiments, the multiple joysticks are each configured to operate a different controllable element or controllable system of the refuse vehicle. The multiple joysticks may be positioned within a cab of the refuse vehicle so that an operator may provide user inputs to the controller by the joysticks. The joysticks can each be communicably coupled with the controller through a wired connection or a wireless connection. The controller can be a single processing unit, a single processor, a processing circuit, etc. The controller may be controller 100. The multiple joysticks may be joystick groups 12*a*-12*c*.

Process 300 includes receiving one or more user inputs from the multiple joysticks at the controller (step 304), according to some embodiments. In some embodiments, the user inputs are provided by an operator of the refuse vehicle by adjusting or moving the joysticks. The adjustment of the joysticks may generate a signal (the user input) that is transferred from each of the joysticks to the controller.

Process 300 includes identifying which of the multiple joysticks provide the user inputs (step 306), according to some embodiments. In some embodiments, step 306 is performed by controller 100. The controller may receive multiple user inputs (e.g., the signals generated by the adjustment of the joysticks) at once. For example, the controller may receive a first user input signal $u_1$, a second user input signal $u_2$, a third user input signal $u_3$, etc. The controller can receive any n number of user input signals, depending on a number of the joysticks, and which of the multiple joysticks are adjusted or operated to provide a user input to the controller. The controller may identify which user input signal is provided from which joystick by analyzing an identifier, a type of signal, a serial number, etc., that is provided with the user input signals u. In some embodiments, the controller can identify which of the multiple joysticks provide the user input signals by identifying which of multiple connection ports or connection interfaces each user input signal is received. For example, the controller may include a mapping between a particular port, connection interface, etc., and a controllable element, or a system of the refuse vehicle.

Process 300 includes identifying one or more controllable elements of the refuse vehicle that correspond to the joysticks that provide the user inputs or provide the user input signals (step 308), according to some embodiments. In some embodiments, step 308 includes using a mapping between each joystick and a corresponding controllable element, or system or actuator of the refuse vehicle. For example, the controller may identify that the first joystick corresponds to a first controllable element, the second joystick corresponds to a second controllable element, the third joystick corresponds to a controllable system, etc. Step 308 can be performed by user input manager 112.

Process 300 includes generating control signals for the one or more controllable elements based on the one or more user inputs and which of the multiple joysticks provide the user inputs (step 310), according to some embodiments. Step 310 can be performed by control signal generator 114 using any of the functionality as described in greater detail above with reference to FIG. 1. Step 310 can be performed by generating control signals for controllable elements 110 based on the user inputs or user inputs signals and a control scheme. The control signals generated for each controllable element can be unique for each controllable element. For example, the control signals for an articulated arm of the refuse vehicle may be different than the control signals for a crusher or compacter of the refuse vehicle.

Process 300 includes operating the one or more controllable elements of the refuse vehicle using the generate control signals (step 312), according to some embodiments. The controller may provide the unique control signals to each of the identified controllable elements 110 so that the controllable elements (e.g., actuators, motors, pump systems, valves, etc.) operate to perform functions as requested by the user inputs.

Advantageously, process 300 can be performed to provide a control or joystick or user input device system that includes multiple user input devices which each control an operation of a corresponding one of multiple controllable elements, but with a single controller. This may reduce costs associated with installing multiple controllers for each joystick or user input device (as other control systems do), and facilitates a simplified control system for a refuse vehicle.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

As utilized herein, the terms “approximately”, “about”, “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms “exemplary” and “example” as used herein to describe various embodiments is intended to indicate that such embodiments are possible examples, representations, and/or illustrations of possible embodiments (and such term is not intended to connote that such embodiments are necessarily extraordinary or superlative examples).

The terms “coupled,” “connected,” and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., “top,” “bottom,” “above,” “below,” “between,” etc.) are merely used to describe the orientation of various elements in the figures. It should be noted that the orientation of various elements may differ according to other exemplary embodiments, and that such variations are intended to be encompassed by the present disclosure.

Also, the term “or” is used in its inclusive sense (and not in its exclusive sense) so that when used, for example, to connect a list of elements, the term “or” means one, some, or all of the elements in the list. Conjunctive language such as the phrase “at least one of X, Y, and Z,” unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A joystick control system for a vehicle, the joystick control system comprising:
- a plurality of joystick input devices, comprising:
  - a first joystick input device configured to operate a controllable element of the vehicle when a selector is in a first state; and
  - a second joystick input device configured to operate the controllable element when the selector is in a second state; and
- a controller configured to:
  - receive a user input from the first joystick input device or the second joystick input device; and
  - provide control signals to the controllable element of the vehicle in response to either (a) receiving the user input from the first joystick input device and the selector being in the first state or (b) receiving the user input from the second joystick input device and the selector being in the second state.

2. The joystick control system of claim 1, wherein the plurality of joystick input devices are positioned within a cab of the vehicle.

3. The joystick control system of claim 1, wherein the user input comprises a user input signal generated at the first joystick input device or the second joystick input device.

4. The joystick control system of claim 1, wherein the vehicle comprises a refuse vehicle, and the controllable element comprises an actuator of a lift apparatus.

5. The joystick control system of claim 1, wherein the control signals that are generated in response to receiving the user input are generated for the controllable element of the vehicle based on which of the plurality of joystick input devices provides the user input and the user input.

6. The joystick control system of claim 1, further comprising a keypad, wherein the keypad is configured to provide a keypad user input to the controller in response to a key press, the keypad user input comprising a command to transition the vehicle between a plurality of predetermined modes of operation.

7. The joystick control system of claim 1, wherein the controller is configured to receive the user input from the first joystick input device or the second joystick input device through a controller area network (CAN) bus of the vehicle.

8. A vehicle, comprising:
- a plurality of controllable elements; and
- a joystick control system comprising a plurality of joystick input devices and a controller, wherein the controller is configured to:
  - receive a user input from one or more of the plurality of joystick input devices; and
  - provide control signals to controllable elements of a first apparatus or a second apparatus of the vehicle to operate the first apparatus or the second apparatus according to the user input based on an identification of which of the first apparatus or the second apparatus is selected.

9. The vehicle of claim 8, wherein the plurality of joystick input devices are positioned within a cab of the vehicle.

10. The vehicle of claim 8, wherein the user input comprises a user input signal generated at one of the plurality of joystick input devices.

11. The vehicle of claim 8, further comprising a selector switch, wherein the selector switch is operable between (i) a first position in which a first joystick input device is activated and configured to operate the first apparatus of the vehicle and a second joystick input device is inactive and limited from controlling the second apparatus of the vehicle, and (ii) a second position in which the second joystick input device is activated and configured to operate the second apparatus of the vehicle and the first joystick input device is inactive and limited from controlling the first apparatus of the vehicle.

12. The vehicle of claim 8, wherein the control signals that are generated in response to receiving the user input are generated for one or more controllable elements of the vehicle based on which of the plurality of joystick input devices provides the user input and the user input.

13. The vehicle of claim 8, further comprising a keypad, wherein the keypad is configured to provide a keypad user input to the controller in response to a key press, the keypad user input comprising a command to transition the vehicle between a plurality of predetermined modes of operation.

14. The vehicle of claim 8, wherein the vehicle comprises an intermediate carry can apparatus, the intermediate carry can apparatus comprising one or more of the controllable elements, wherein at least one of the plurality of joystick input devices is configured to provide a user input to the controller and the controller is configured to output control signals to the intermediate carry can apparatus to operate the intermediate carry can apparatus.

* * * * *